United States Patent
Walczyk et al.

(10) Patent No.: US 9,063,683 B2
(45) Date of Patent: Jun. 23, 2015

(54) STORING PRINT OPTIONS AND PRINT ACCOUNTING CREDENTIALS WHEN PRINTING VIA E-MAIL

(71) Applicant: XEROX CORPORATION, Norwalk, CT (US)

(72) Inventors: Mathew J. Walczyk, Penfield, NY (US); James M. Rego, Webster, NY (US); Heidi O. Thatcher, Webster, NY (US); Roger T. Ellefson, Manassas, VA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/064,355

(22) Filed: Oct. 28, 2013

(65) Prior Publication Data

US 2015/0116759 A1   Apr. 30, 2015

(51) Int. Cl.
*G06F 3/12* (2006.01)

(52) U.S. Cl.
CPC ............ *G06F 3/1253* (2013.01); *G06F 3/1205* (2013.01); *G06F 3/1286* (2013.01)

(58) Field of Classification Search
None
See application file for complete search history.

(56) References Cited

U.S. PATENT DOCUMENTS

| | | | |
|---|---|---|---|
| 6,542,892 B1 | 4/2003 | Cantwell | |
| 6,801,935 B2 | 10/2004 | Shen | |
| 6,842,766 B2 * | 1/2005 | Brockway et al. | 709/203 |
| 7,136,180 B2 | 11/2006 | Utsunomiya | |
| 7,375,835 B1 | 5/2008 | Hull et al. | |
| 8,392,837 B2 | 3/2013 | Li | |
| 2002/0051200 A1 * | 5/2002 | Chang et al. | 358/1.15 |
| 2002/0097414 A1 * | 7/2002 | Utsunomiya | 358/1.13 |
| 2003/0081019 A1 * | 5/2003 | Frolik et al. | 347/5 |
| 2003/0202010 A1 * | 10/2003 | Kerby et al. | 345/744 |
| 2005/0004845 A1 | 1/2005 | Vaughn | |
| 2010/0309510 A1 * | 12/2010 | Hansen | 358/1.15 |
| 2011/0063658 A1 * | 3/2011 | Natori | 358/1.15 |
| 2013/0109353 A1 * | 5/2013 | Chang et al. | 455/411 |
| 2013/0222618 A1 * | 8/2013 | Chang et al. | 348/207.2 |

* cited by examiner

*Primary Examiner* — Marcus T Riley
(74) *Attorney, Agent, or Firm* — Gibb & Riley, LLC

(57) ABSTRACT

Methods and systems provide a network-based site for obtaining user preferences, using a computerized device connected to a computer network. User preferences are received through the network-based site, and the user preferences comprise printer option selections that are specific to a specific printing device and a specific user. Such methods and systems store the user preferences using the computerized device. After storing the user preferences, the methods and systems receive a print job and an indication to apply the user preferences. In response to only receiving the print job and the indication to apply the user preferences, the methods and systems automatically print the print job according to the user preferences using the specific printing device.

24 Claims, 6 Drawing Sheets

STORING PRINT OPTIONS AND PRINT ACCOUNTING CREDENTIALS WHEN PRINTING VIA E-MAIL

BACKGROUND

Systems and methods herein generally relate to e-mail printing and more particularly, to maintaining user preferences for e-mail printing.

Systems that allow submission of print jobs via e-mail can require users to manually specify options in each e-mail. For example, "mail to" links can be used to specify user preferences, or embedded text in the e-mail subject or e-mail body can be used to specify user preferences. However, such mechanisms are not user friendly and can be error prone.

For example, some conventional systems use mail-to links in an e-mail response to the user's e-mail print submission to set print options. When a user desires to set more than one option, the user needs to send and receive several e-mails to make all of the desired settings. Another method embeds the text for the desired option in the e-mail body. This requires human entry, which is error prone and difficult to localize.

SUMMARY

Exemplary methods herein provide a network-based site for obtaining user preferences (using a computerized device connected to a computer network) and receive the user preferences through the network-based site. For example, the network-based site can comprise a hypertext transfer protocol (HTTP) world wide web (WWW) site based on Internet Protocol (IP) addresses.

The user preferences can include printer option selections and accounting option/credential selections that are specific to a specific printing device and a specific user. Such methods store the user preferences using the computerized device. The printer option selections can include, for example, monochrome or color printing, print quality, print speed, sheet size, sheet quality, simplex or duplex, and/or finishing options, etc. The accounting option selections can include, for example, printing rates, identification of entities to be charged, and/or notifications to be made, etc.

With methods herein, after storing the user preferences, a print job can be uploaded or an e-mail can be addressed and sent to a specific printing device. The e-mail comprises an e-mail from a user's e-mail account to a printer-specific e-mail account. Each of the printer-specific e-mail accounts is associated with a single printing device. The e-mail includes an attached print job and an indication to apply the user preferences when printing the attached print job. In response to only the print job or e-mail being received by the specific printing device, the specific printing device automatically prints the attached print job according to the user preferences and provides accounting of the print job to an accounting entity according to the user preferences.

Exemplary systems herein comprise a network-based site for obtaining user preferences (that uses a computerized device connected to a computer network). The network-based site receives the user preferences, and such user preferences include printer option selections and accounting option selections, as noted above. One or more local or remote computerized devices store the user preferences. With systems herein, a specific printing device receives an uploaded print job or an e-mail addressed to the specific printing device. The e-mail comprises an attached print job and an indication to apply the user preferences when printing the attached print job. In response to only the e-mail being received by the specific printing device, the computerized device causes the specific printing device to print the attached print job according to the user preferences and the computerized device causes the specific printing device to provide accounting of the print job to an accounting entity according to the user preferences.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, conventional e-mail printing mechanisms are not user friendly and can be error prone. Therefore, in the printing system described herein each user has an account that stores printer-specific settings (that are unique to each different user/printer combination). Further, mobile printing applications are available, a web-based user interface (web site) is provided, e-mail submissions are supported, etc. A default set of system wide options to select color mode, staple, tray, paper, simplex/duplex, etc., is set by each user via the mobile app or web site. The system obtains default accounting information such as domain/username and password that operate well with proprietary and third party accounting systems. These stored options are automatically applied when printing via e-mail submissions. These values are also pre-selected when using the mobile app or web site print submission methods.

These systems provide a printer-by-printer set of option selections for each user. When the user prints using the mobile app or the web site, they are presented with the available options. The user can change the options and, prior to e-mailing the print job, the systems and methods herein save these settings as the default for this printer/user combination. Future printing by that user to that specific printer via the mobile app or web site will show these saved options as the defaults. Printing via e-mail submission to that printer by that user will use these saved settings. This makes the e-mail print path predictable, allowing the user to set the options and get the desired output.

Therefore, the systems and methods herein associate default print options to a print job sent to a device via e-mail. The system works in two stages: the one-time set-up and the subsequent e-mail-to-print workflow. In the one-time set-up, the end-user makes use of a mobile application or a web user interface (UI) to select the default print options for jobs and send a document to print. In subsequent interactions with the printer the end-user only needs to use the e-mail-to-print workflow, and the system and methods make use of the saved defaults to print. This provides a more user-friendly interface to select print options for e-mail jobs compared to e-mail only alternatives, and provides a secure way to enable printing via e-mail to a printer that has accounting enabled or is being managed by an accounting system.

Figure 1:
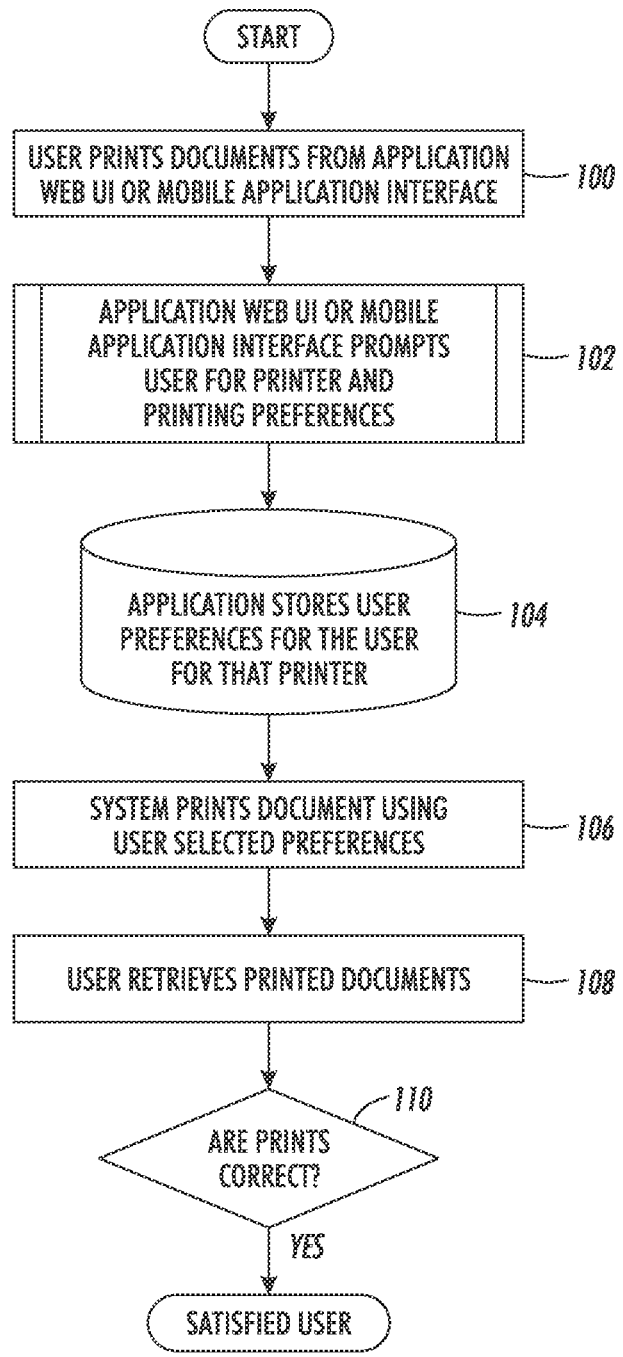
FIG. 1 is a flow diagram of various methods herein.

More specifically, as shown in FIG. 1, during the one-time set-up, the user establishes a print job using the web UI (web site) or mobile app in item 100. In item 102, the web UI or mobile app interface prompts the user for printer and printing preferences for the specific printer identified. For example, when identifying a specific printer, the user can select a printer from a list within the web UI or mobile app that identifies the printer by location (street address, building and floor location, room number, etc.). Alternatively, a user may be standing directly in front of a printer and can identify the printer by location, unique name/number from a sign that is attached to the printer, the printer serial number, etc. However, the user identifies the printer, and the printing and accounting preferences that the user supplies will relate only to that printer, as each individual user preferences record relates to a unique combination of specific user and specific printer (unique user/printer combination).

These user preferences are stored in item 104, where the application stores the specific user's preferences for that specific printer. Again, each individual user preferences record that is stored in item 104 relates to a unique user/printer combination. If a user is establishing preferences for a printer that they have never used before in item 102, but the user has previously stored preferences for other printers (from item 104), the systems and methods provide the user various options (through the web UI or mobile app) to copy preferences from another previously stored user/printer combination. When user preferences are copied, the systems and methods herein create a new unique record of preferences for that new printer as another user/printer combination.

Subsequently, the printer prints the documents according to the user's preferences (106) and the user retrieves the printed documents from that printer in item 108. If the prints are correct 110, the user may be satisfied with the prints. If not, the user can change the user preferences in item 102 (which new preferences will be saved over the old preferences in item 104).

Figure 2:
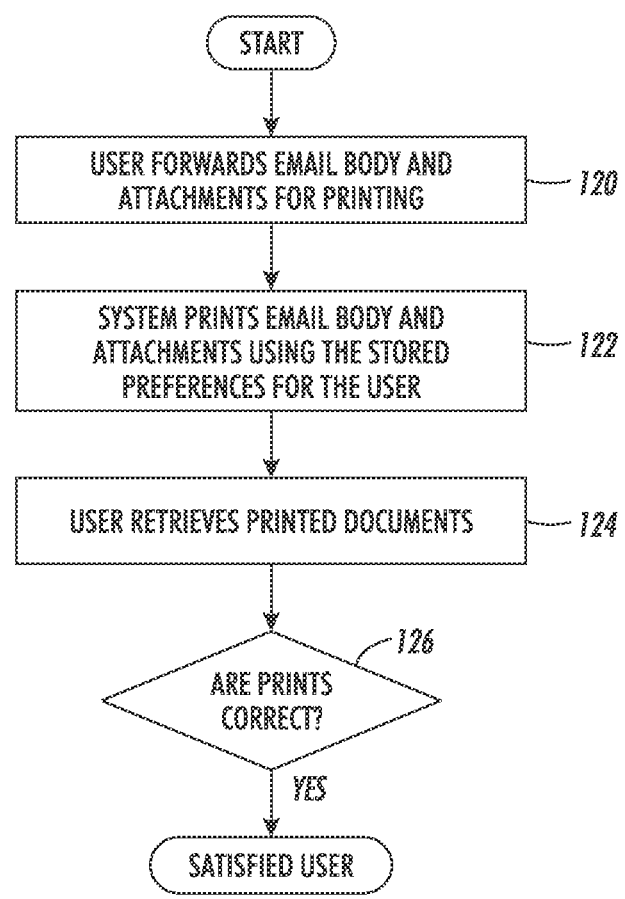
FIG. 2 is a flow diagram of various methods herein.

After the one-time set-up in FIG. 1, the user can use the streamlined processing shown in FIG. 2 for all future printing operations that involve using that specific printer. More specifically, as shown in FIG. 2, the only action the user needs to take is to upload the document to be printed through the web UI or mobile app, or forward an e-mail with the document to be printed as an attachment (120). From that point on in the processing, the remaining steps are automated and the user does not need to re-establish printer or accounting credential settings. More specifically, the system and methods herein use the stored preferences (for that specific user and that specific printer) to print the uploaded document, e-mail, and/or attachments in item 122. As with the previous processing, the user retrieves the printed documents from that printer in item 124. If the prints are correct (126) the user may be satisfied with the prints. If not, the user can return to the Web UI or mobile app shown in FIG. 1 to change the user preferences in item 102 (which new preferences will be saved over the old preferences in item 104).

Figure 3:
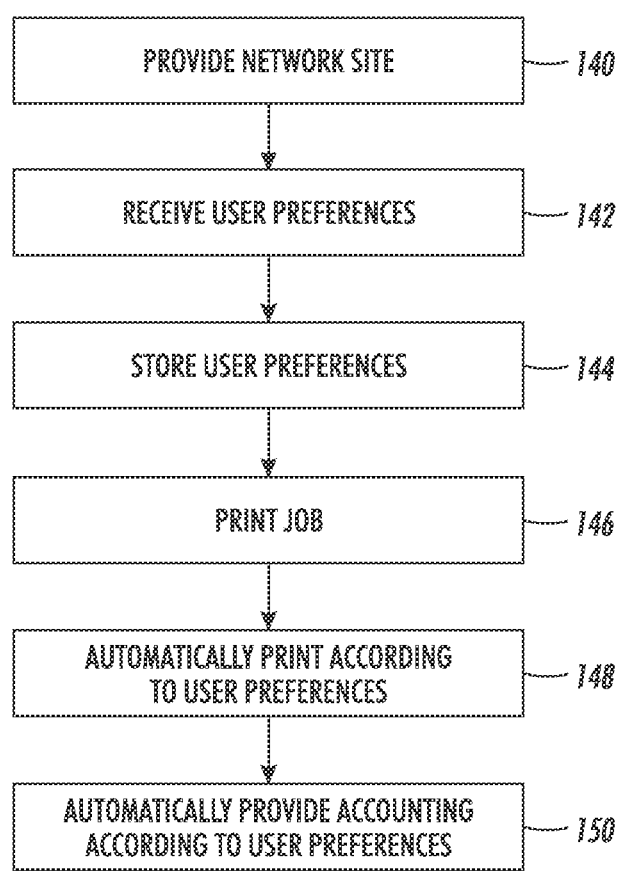
FIG. 3 is a flow diagram of various methods herein.

FIG. 3 is flowchart illustrating exemplary methods herein in a more generalized presentation. In item 140, these methods provide a network-based site for obtaining user preferences (using a computerized device connected to a computer network). For example, the network-based site can comprise a hypertext transfer protocol (HTTP) world wide web (WWW) site based on Internet Protocol (IP) addresses or other wide area networks. Alternatively the network-based site can be an application (mobile app, etc.) interacting with the network-based computerized device. In item 142, these methods receive the user preferences through the network-based site.

The user preferences can include printer option selections and accounting option selections that are specific to a specific printing device and a specific user. Such methods store the user preferences (the unique record of a specific user/printer combination) in item 144 using the computerized device. The printer option selections can include, for example, monochrome or color printing, print quality, print speed, sheet size, sheet quality, simplex or duplex, and/or finishing options, etc. The accounting option selections can include, for example, printing rates, identification of entities to be charged, and/or notifications to be made, etc.

With methods herein, after storing the user preferences, a print job can be uploaded through the network-based site or an e-mail can be addressed and sent to a specific printing device in item 146. The e-mail comprises an e-mail from the specific user e-mail account to the printer-specific e-mail account that corresponds to the unique specific user/printer combination of user preferences. Each of the printer-specific e-mail accounts is associated with a single printing device. The e-mail includes an attached print job, and the uploaded print job or e-mail also includes an indication to apply the specific user/printer combination of user preferences when printing the attached print job. In response to only the e-mail being received by the specific printing device, the specific printing device automatically prints the attached print job according to the user preferences (item 148) and provides accounting of the print job to an accounting entity (accounting software, accounting department, etc.) according to the user preferences (item 150), without requiring any other action from the user. Therefore, because the user's preferences were previously stored for that specific printer, the only step to be taken by the user is to upload the print job or send the e-mail and indicate that the previously stored preferences should be used (which avoids having the user re-enter their printing and accounting preferences).

Figure 4:
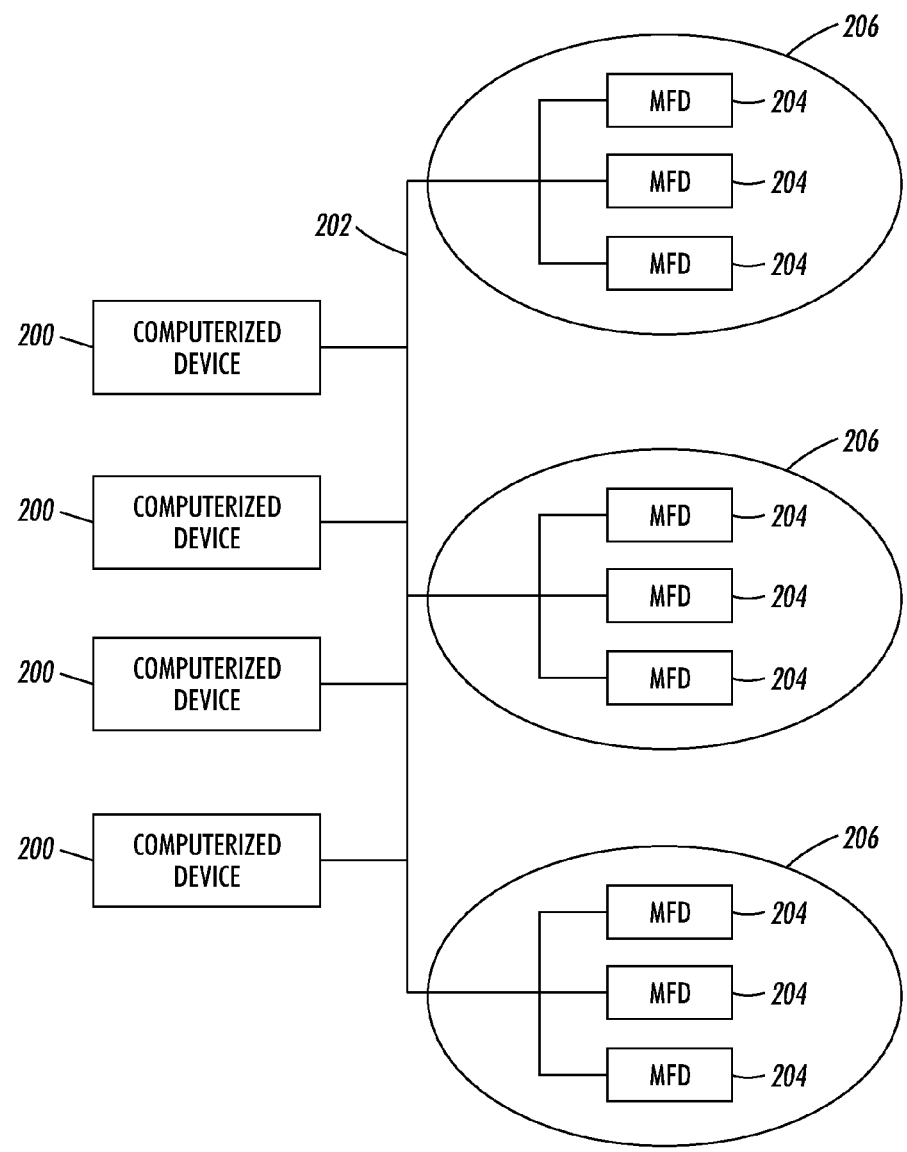
FIG. 4 is a schematic diagram illustrating systems herein.

As shown in FIG. 4, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 5:
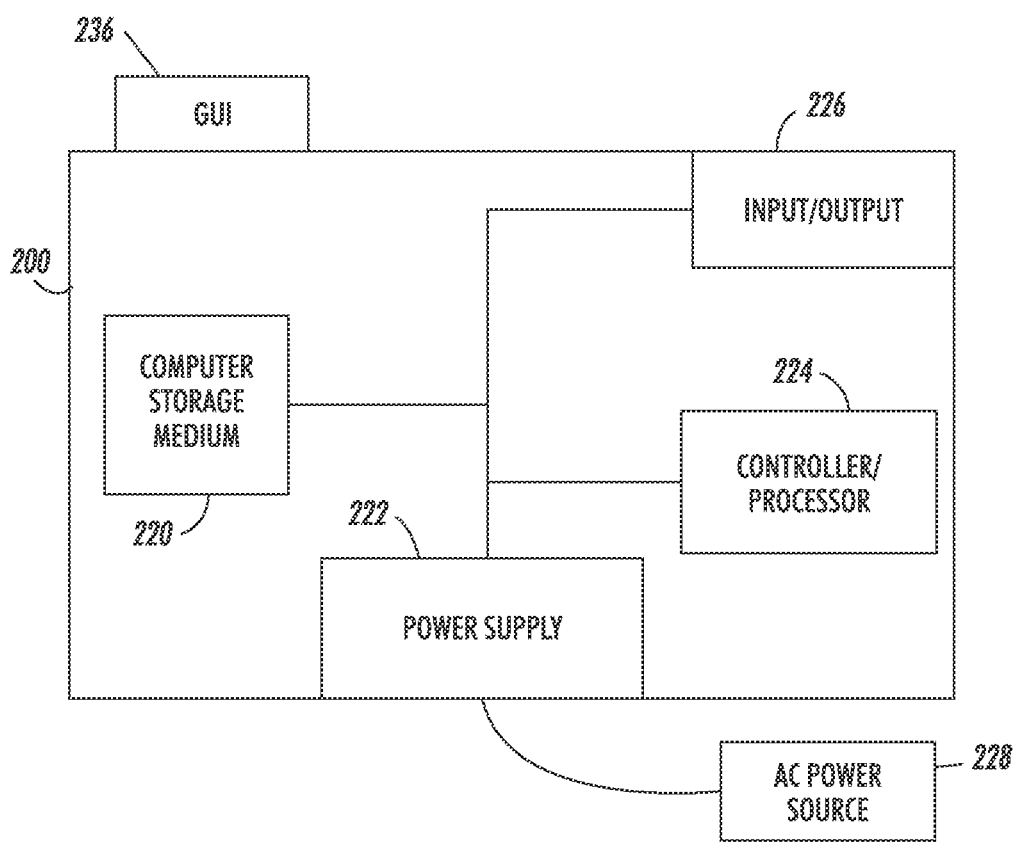
FIG. 5 is a schematic diagram illustrating devices herein.

FIG. 5 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 3, a body housing has one or more functional components that operate on power supplied from an alternating current (AC) source 228 by the power supply 222. The power supply 222 can comprise a power storage element (e.g., a battery, etc).

Figure 6:
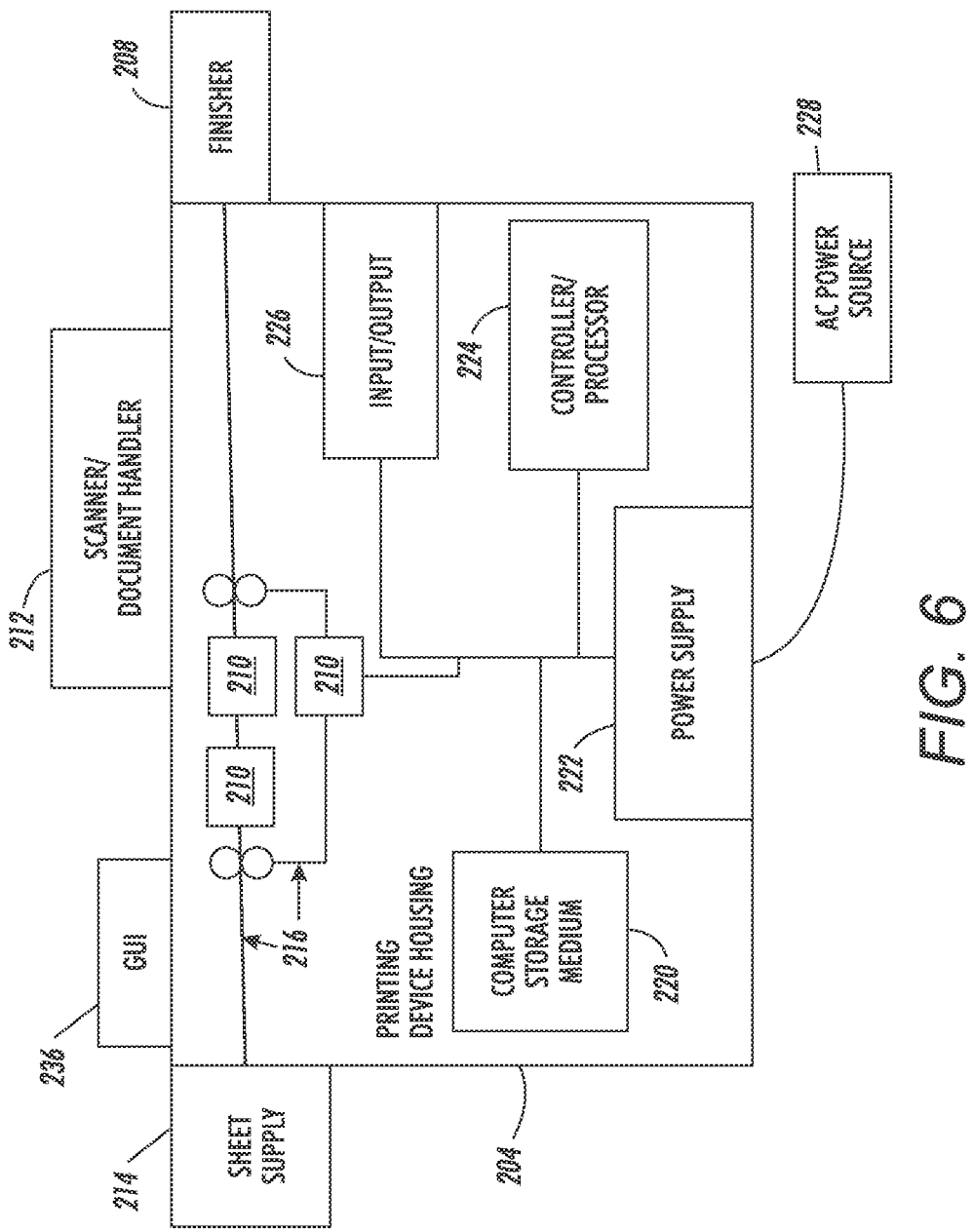
FIG. 6 is a schematic diagram illustrating devices herein.

FIG. 6 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Thus, exemplary systems herein comprise a network-based site for obtaining user preferences (that uses a computerized device 200 connected to a computer network 202). The network-based site receives the user preferences, and such user preferences include printer option selections and accounting option selections, as noted above. The computerized device 200 stores the user preferences. With systems herein, a specific printing device 204 receives an uploaded print job or an e-mail addressed to the specific printing device 204. The e-mail comprises an attached print job. The uploaded print job and the e-mail include an indication to apply the user preferences when printing the attached print job. In response to only the upload or the e-mail being received by the specific printing device 204, the computerized device 200 causes the specific printing device 204 to print the attached print job according to the user preferences and the computerized device 200 causes the specific printing device 204 to provide accounting of the print job to an accounting database (which can also be maintained in one or more of the computerized devices 200) according to the user preferences. For example, the specific printing device 204 can request and receive a download of such user preferences from the computerized device 200 through the network 202 or the computerized device can push such user preferences to the specific printing device 204 (on its own) when notified that a print job has been sent (downloaded or e-mailed) to the specific printing device 204.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The terms automated or automatically mean that once a process is started (by a machine or a user) one or more machines perform the process without further input from any user. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    storing user printer settings provided by a specific user submitting previous print jobs to a network-based site for different printing devices to obtain default user preferences for different specific printer and user combinations, using a computerized device connected to a computer network, each of said default user preferences for different specific printer and user combinations comprising printer option selections that are specific to a specific printing device of said different printing devices and said specific user;
    after said storing said default user preferences for different specific printer and user combinations, receiving a print job from said specific user for a selected printing device of said different printing devices and an indication to apply default user preferences for a specific printer and user combination, said default user preferences for said specific printer and user combination corresponding to said specific user and said selected printing device and being one of said default user preferences for different specific printer and user combinations; and
    in response to only said receiving said print job and said indication to apply said default user preferences for said specific printer and user combination, automatically printing said print job according to said default user preferences for said specific printer and user combination using said selected printing device.

2. The method according to claim 1, said submitting previous print jobs comprising said specific user submitting an e-mail addressed to said specific printing device, said e-mail comprising an e-mail from a user e-mail account to a printer-specific e-mail account.

3. The method according to claim 2, each said printer-specific e-mail account being associated with a single printing device.

4. The method according to claim 1, said network-based site comprising a hypertext transfer protocol (HTTP) world wide web (WWW) site based on Internet Protocol (IP) addresses.

5. The method according to claim 1, said printer option selections comprising at least one of:
    monochrome or color printing;
    print quality;
    print speed;
    sheet size;

sheet quality;
simplex and duplex; or
finishing options.

6. The method according to claim 1, said default user preferences for different specific printer and user combinations comprising accounting option selections comprising at least one of:
printing rates;
identification of entities to be charged; or
notifications to be made.

7. A method comprising:
storing user printer settings provided by a specific user submitting previous print jobs to a network-based site for different printing devices to obtain default user preferences for each different specific printer and user combination, using a computerized device connected to a computer network, said default user preferences for each different specific printer and user combination comprising printer option selections and accounting option selections that are specific to a specific printing device of said different printing devices and said specific user;
after said storing said default user preferences for different specific printer and user combinations, receiving an e-mail from said specific user addressed to said specific printing device, said e-mail comprising an attached print job and an indication to apply default user preferences for a specific printer and user combination when printing said attached print job, said default user preferences for said specific printer and user combination corresponding to said specific user and said selected printing device and being one of said default user preferences for different specific printer and user combinations; and
in response to only said e-mail being received by said specific printing device, automatically:
printing said attached print job according to said default user preferences for said specific printer and user combination using said specific printing device; and
providing accounting of said print job to an accounting entity according to said default user preferences for said specific printer and user combination using said selected printing device.

8. The method according to claim 7, said e-mail comprising an e-mail from a user e-mail account to a printer-specific e-mail account.

9. The method according to claim 8, each said printer-specific e-mail account being associated with a single printing device.

10. The method according to claim 7, said network-based site comprising a hypertext transfer protocol (HTTP) world wide web (WWW) site based on Internet Protocol (IP) addresses.

11. The method according to claim 7, said printer option selections comprising at least one of:
monochrome or color printing;
print quality;
print speed;
sheet size;
sheet quality;
simplex and duplex; or
finishing options.

12. The method according to claim 7, said accounting option selections comprising at least one of:
printing rates;
identification of entities to be charged; or
notifications to be made.

13. A system comprising:
a network-based site storing user printer settings provided by a specific user submitting previous print jobs for different printing devices to obtain default user preferences for each different specific printer and user combination using a computerized device, said computerized device being connected to a computer network,
said default user preferences for each different specific printer and user combination comprising printer option selections that are specific to a specific printing device of said different printing devices and said specific user,
after said storing said default user preferences for different specific printer and user combinations, said specific printing device receiving a print job from said specific user and an indication to apply default user preferences for a specific printer and user combination, said default user preferences for said specific printer and user combination corresponding to said specific user and said selected printing device and being one of said default user preferences for different specific printer and user combinations, and
in response to only said receiving said print job and said indication to apply said default user preferences for said specific printer and user combination, said computerized device causing said selected printing device to print said print job according to said default user preferences for said specific printer and user combination.

14. The system according to claim 13, said submitting previous print jobs comprising said specific user submitting an e-mail addressed to said specific printing device, said e-mail comprising an e-mail from a user e-mail account to a printer-specific e-mail account.

15. The system according to claim 14, each said printer-specific e-mail account being associated with a single printing device.

16. The system according to claim 13, said network-based site comprising a hypertext transfer protocol (HTTP) world wide web (WWW) site based on Internet Protocol (IP) addresses.

17. The system according to claim 13, said printer option selections comprising at least one of:
monochrome or color printing;
print quality;
print speed;
sheet size;
sheet quality;
simplex and duplex; or
finishing options.

18. The system according to claim 13, said default user preferences for different specific printer and user combinations comprising accounting option selections comprising at least one of:
printing rates;
identification of entities to be charged; or
notifications to be made.

19. A system comprising:
a network-based site storing user printer settings provided by a specific user submitting previous print jobs for different printing devices to obtain default user preferences for each different specific printer and user combination using a computerized device, said computerized device being connected to a computer network,
said default user preferences for each different specific printer and user combination comprising printer option selections and accounting option selections that are specific to a specific printing device of said different printing devices and said specific user, after said storing said default user preferences for different specific printer/user combinations, a specific printing device receiving an e-mail from said specific user addressed to said specific printing device, said e-mail comprising an attached print job and an indication to apply default user preferences for a specific printer and user combination when printing said attached print job, said default user preferences for said specific printer and user combination corresponding to said specific user and said selected printing device and being one of said default user preferences for different specific printer and user combinations, and in response to only said e-mail being received by said specific printing device:

said computerized device causing said selected printing device to print said attached print job according to said default user preferences for said specific printer and user combination; and said computerized device causing said specific printing device to provide accounting of said print job to an accounting entity according to said default user preferences for said specific printer and user combination.

20. The system according to claim 19, said e-mail comprising an e-mail from a user e-mail account to a printer-specific e-mail account.

21. The system according to claim 20, each said printer-specific e-mail account being associated with a single printing device.

22. The system according to claim 19, said network-based site comprising a hypertext transfer protocol (HTTP) world wide web (WWW) site based on Internet Protocol (IP) addresses.

23. The system according to claim 19, said printer option selections comprising at least one of:

monochrome or color printing;

print quality;

print speed;

sheet size;

sheet quality;

simplex and duplex; or finishing options.

24. The system according to claim 19, said accounting option selections comprising at least one of:

printing rates;

identification of entities to be charged; or notifications to be made.

\* \* \* \* \*